(12) United States Patent
Kelliher et al.

(10) Patent No.: US 7,254,648 B2
(45) Date of Patent: Aug. 7, 2007

(54) UNIVERSAL BROADBAND SERVER SYSTEM AND METHOD

(75) Inventors: Timothy L. Kelliher, Alameda, CA (US); Patrick James Coleman, San Carlos, CA (US); P. Michael Farmwald, Portola Valley, CA (US)

(73) Assignee: UTStarcom, Inc., Alameda, CA (US)

( * ) Notice: Subject to any disclaimer, the term of this patent is extended or adjusted under 35 U.S.C. 154(b) by 976 days.

(21) Appl. No.: 10/354,529

(22) Filed: Jan. 30, 2003

(65) Prior Publication Data

US 2004/0153544 A1 Aug. 5, 2004

(51) Int. Cl.
  G06F 15/16 (2006.01)
  H04L 12/54 (2006.01)
  H04L 12/56 (2006.01)
(52) U.S. Cl. .................. 709/250; 709/228; 370/420
(58) Field of Classification Search ............... 709/228, 709/250
  See application file for complete search history.

(56) References Cited

U.S. PATENT DOCUMENTS

| | | | |
|---|---|---|---|
| 4,393,492 A | 7/1983 | Bishop | |
| 4,730,311 A | 3/1988 | Carse et al. | |
| H1175 H | 4/1993 | Giorgio | |
| 5,260,937 A | 11/1993 | Eames et al. | |
| 5,390,239 A | 2/1995 | Morris et al. | |
| 5,619,688 A * | 4/1997 | Bosworth et al. | 707/4 |
| 5,668,857 A | 9/1997 | McHale | |
| 5,852,655 A | 12/1998 | McHale et al. | |
| 5,898,761 A | 4/1999 | McHale et al. | |
| 5,905,778 A | 5/1999 | Shires | |
| 5,923,671 A | 7/1999 | Silverman | |
| 5,991,292 A * | 11/1999 | Focsaneanu et al. | 370/352 |
| 6,005,873 A | 12/1999 | Amit | |
| 6,009,106 A | 12/1999 | Rustad et al. | |
| 6,014,431 A | 1/2000 | McHale et al. | |
| 6,016,488 A * | 1/2000 | Bosworth et al. | 707/4 |
| 6,038,594 A * | 3/2000 | Puente et al. | 709/217 |
| 6,061,392 A | 5/2000 | Bremer et al. | |
| 6,084,874 A | 7/2000 | Nguyen et al. | |
| 6,160,808 A | 12/2000 | Maurya | |
| 6,160,843 A | 12/2000 | McHale et al. | |

(Continued)

FOREIGN PATENT DOCUMENTS

WO WO 99/20033 4/1999

OTHER PUBLICATIONS

"X-Cel & GDSL System V.90 RIs@ Analog Modem Support," GoDigital Networks-Technical Note, 7 pages, Jan. 23, 2001.
"Connection Optimized Link Technology," White paper, Ramp Networks, 6 pages, (1998).

(Continued)

Primary Examiner—David Wiley
Assistant Examiner—George C. Neurauter, Jr.
(74) Attorney, Agent, or Firm—McDonnell Boehnen Hulbert & Berghoff LLP

(57) ABSTRACT

A universal broadband server connected between a plurality of subscriber lines, at least one upstream link, and a central office provides broadband service to a plurality of customer premise equipment devices connected to the plurality of subscriber lines. The universal broadband server may also provides analog modem service to the plurality of customer premise equipment devices connected to the plurality of subscriber lines. A dynamic bandwidth allocation method adjusts the transmit power and bandwidth at which the universal broadband server communicates with the plurality of customer premise equipment devices in consideration of the maximum available bandwidth provided by the at least one upstream link, and the maximum available power.

20 Claims, 9 Drawing Sheets

U.S. PATENT DOCUMENTS

| | | | |
|---|---|---|---|
| 6,169,788 B1 | 1/2001 | McHale et al. | |
| 6,198,749 B1 | 3/2001 | Hui | |
| 6,324,212 B1 | 11/2001 | Jenness | |
| 6,349,123 B1 | 2/2002 | Kim | |
| 6,373,852 B1 | 4/2002 | Foladare et al. | |
| 7,142,590 B2 | 11/2006 | Kelliher | |
| 2003/0053449 A1* | 3/2003 | Owens et al. | 370/355 |
| 2003/0053493 A1* | 3/2003 | Graham Mobley et al. | 370/538 |
| 2003/0086486 A1* | 5/2003 | Graziano et al. | 375/222 |
| 2003/0099286 A1* | 5/2003 | Graziano et al. | 375/222 |
| 2004/0125881 A1* | 7/2004 | Qiu et al. | 375/260 |

OTHER PUBLICATIONS

"Powerful Internet and Remote Access Platform," WebRamp 361i, 2 pages, Mar. 2000.

"Dualing Modems Reach 112K," Wired News, 3 pages, Feb. 3, 2000.

"SupraSonic Dual Modem: Twice is Nice," PCWorld.com, 3 pages, Jul. 27, 1998.

"Copper Edge 200 RT DSL Concentrator," 4 pages, Aug. 2001.

"Multi-Tenant Unit Profitability Analysis," 10 pages, Dec. 2000.

\* cited by examiner

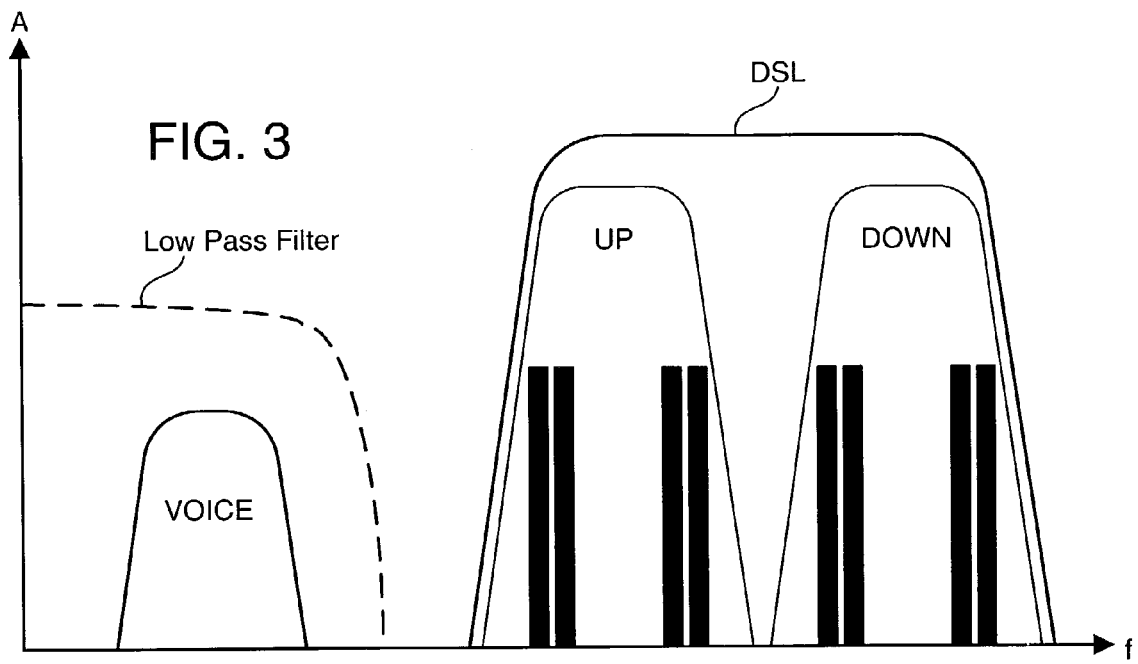
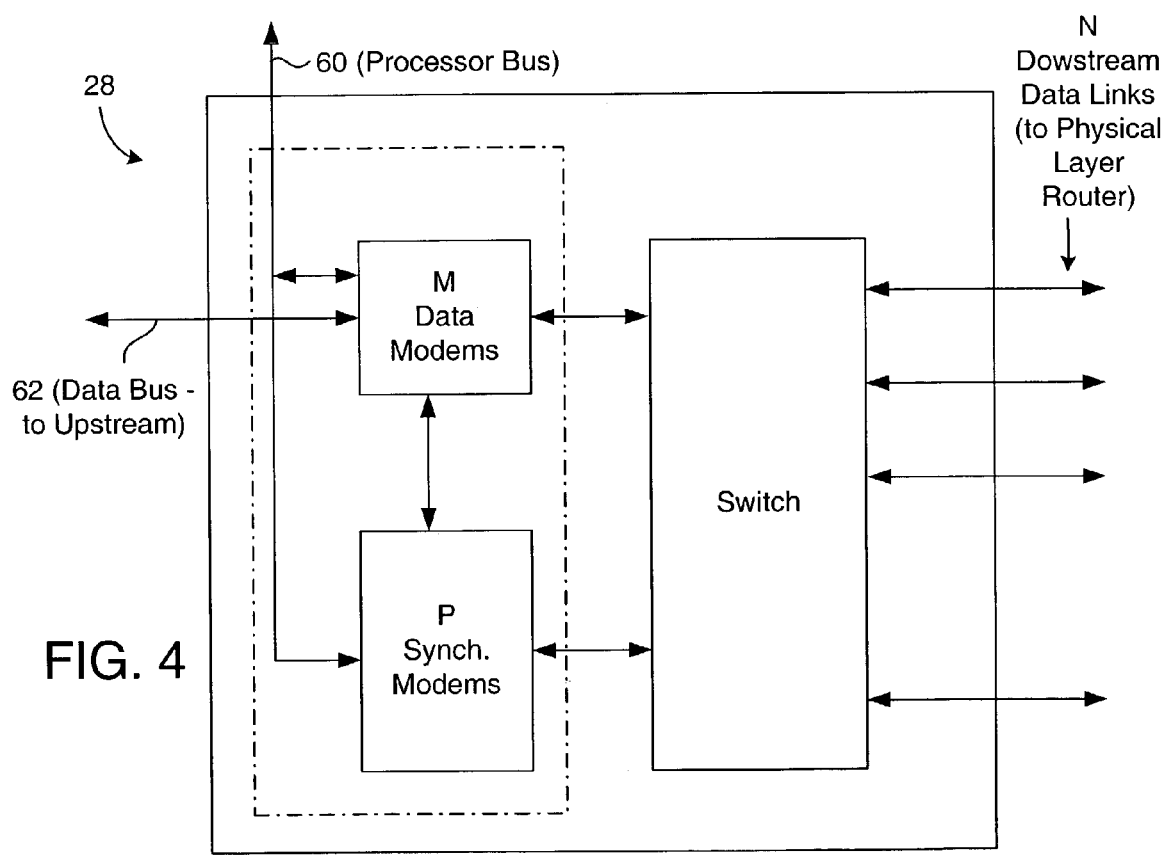

UNIVERSAL BROADBAND SERVER SYSTEM AND METHOD

This application is related to the following pending applications, all of which are hereby incorporated by reference: U.S. patent application Ser. No. 10/074,832 filed Feb. 13, 2002 which claims the benefit of U.S. provisional application Ser. No. 60/328,648 filed Oct. 11, 2001, U.S patent application Ser. No. 10/159,496 filed May 31, 2002 which is a continuation-in-part of U.S. patent application Ser. No. 10/074,832 filed Feb. 13, 2002 which claims the benefit of U.S. Provisional application Ser. No. 60/328,648 filed Oct. 11, 2001, and U.S. patent application Ser. No. 10/194,375 filed Jul. 12, 2002.

BACKGROUND

Typically a digital subscriber line (DSL) network comprises a plurality of customer premise equipment (CPE) devices connected to a digital subscriber line access multiplexer (DSLAM) via a bundle of twisted-pair wires for providing broadband service. FIG. 1 illustrates a prior art DSL network. The DSLAM is also connected to a network for sending and receiving data to and from the respective CPE devices. The DSLAM may further be connected to other devices, such as routers, for directing and switching data through the DSL network. A DSLAM comprises a plurality of DSL modems which may be implemented in software residing on one or more digital signals processors (DSP). The customer premise equipment may include a variety of devices such as modems and handsets. By way of example the customer premise equipment of FIG. 1 comprise DSL modems capable of communicating with the DSLAM. The DSLAM may be located, for example, in a central office (CO).

Each of the N CPE DSL modems of FIG. 1 are connected directly to a respective DSL modem in the DSLAM via a dedicated twisted-pair conductor, or POTS (plain old telephone service) line. The twisted-pair conductors are usually part of the public switched telephone network (PSTN). Typically these lines are supplied in bundles of 25 twisted-pair conductors per bundle. There may be greater or fewer twisted-pair conductors per bundle. For example, a typical DSLAM may supply DSL service at VDSL data rates to 25 DSL modems located at the customer end. VDSL data rates are up to 26 Mbps (megabits per seconds) upstream and downstream. Other forms of DSL service having different data rates may also be supplied such as ADSL (up to 1.5 Mbps upstream, 8 Mbps downstream), SHDSL (up to 4 Mbps upstream and downstream), and HDSL (1.5 Mbps upstream and downstream).

High speed dedicated DSL service as described above has many disadvantages. For example, with 25 DSL modems at the customer end, and with each dedicated line capable of carrying data at a rate of 1.5 Mbps, the DSLAM must be able to process data at a rate of 37.5 Mbps. Such high data rate requirements typically require a pool of high speed, and expensive digital signal processors. In addition to the expense, the large number of high speed digital signal processors require large amounts of power, which is frequently in short supply at some of the remote locations that the DSLAMs may be located in.

Furthermore, while dedicated DSL service is supplied to the customer, it is often not needed. Most customer's DSL modems sit idle through much of the day and night. For example, for the most part the customer's DSL modem is not being used while the customer is away at work, or asleep. This represents the majority of the day, even for heavy home computer users. Additionally, even when a customer is using their computer and DSL modem, the DSL communications tend to be bursty. That is, a user might need or want a large amount of bandwidth to download or upload files, but once the file transfers have completed the DSL line servicing the customer might carry only a small amount of data for comparatively long periods of time while the customer uses their computer to view files, write letter, and the like.

Even if customers desire broadband service, many customers may not be able to receive such service as they may be located too far away from the central office that houses the DSLAM. Moving the DSLAM closer to the customers is often impractical or impossible for many reasons, among them being that the electricity required to power the DSLAM may be insufficient in the new location, and running additional power to the new location may be prohibitively expensive.

In such cases, customers may use other forms of communication, namely analog modems. A bank of analog modems may be placed at the central office, often alongside the DSLAM, to provide analog modem service such as ITU-T V.90 service. These analog modems while providing lower speed data service than DSL, are able to operate over longer distances than DSL. Unfortunately, along with occupying a lot of space, which is often in short supply in a central office, banks of analog modems share many of the space and power problems as banks of DSL modems.

SUMMARY

By way of introduction, the preferred embodiments below provide a universal broadband server system and method. The universal broadband server is connected between a plurality of subscriber lines, at least one upstream link, and a central office. The universal broadband server provides broadband, and optionally, analog modem service, to a plurality of customer premise equipment devices connected to the plurality of subscriber lines. The universal broadband server comprises a downstream modem pool, a physical layer router in communication with the downstream modem pool, and a downstream line interface in communication with the physical layer router. In one embodiment, the physical layer router comprises a fast line: acquisition tone detector. The downstream line interface comprises a plurality of subscriber ports connected to the subscriber lines. The universal broadband server further comprises an upstream modem pool, and an upstream isolation interface in communication with the upstream modem pool. The upstream isolation interface comprises at least one upstream port connected to the at least one upstream link. Additionally, the universal broadband server comprises a processor in communication with the upstream modem pool, the downstream modem pool, and the physical layer router. A memory is in communication with the processor. Power circuitry is in communication with a power source and with the processor. Further, a central office interface is in communication with the downstream line interface. The central office interface comprises a plurality of central office ports in communication with the central office. A dynamic bandwidth allocation method adjusts the transmit power and bandwidth for each subscriber port in consideration of the maximum available bandwidth provided by the at least one upstream link, and the maximum available power from the power circuitry.

The foregoing paragraph has been provided by way of general introduction, and it should not be used to narrow the scope of the following claims. The preferred embodiments will now be described with reference to the attached drawings.

BRIEF DESCRIPTION OF THE DRAWINGS

FIG. 3 shows the relative frequency bands for voice communications and xDSL communications.
FIG. 4 is a system for oversubscribing a pool of modems.

DETAILED DESCRIPTION OF THE PRESENTLY PREFERRED EMBODIMENTS

Figure 1:
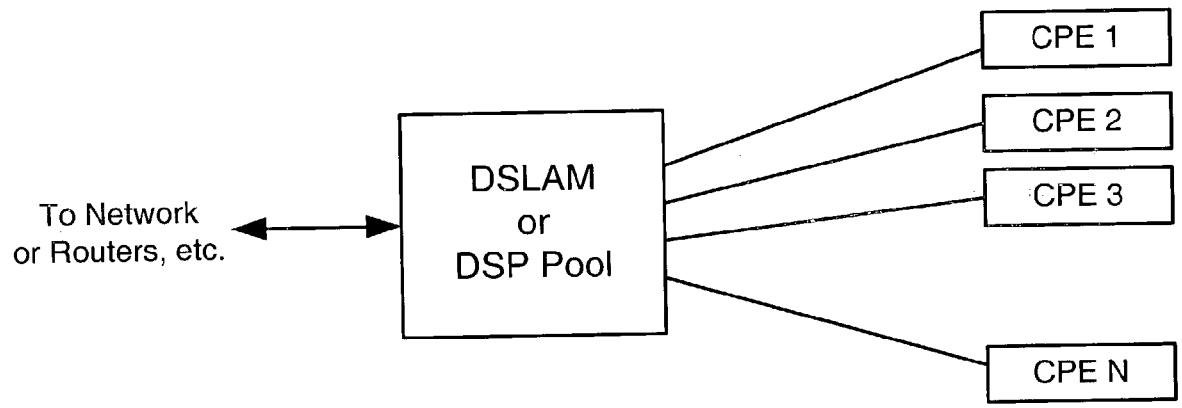
FIG. 1 is a prior art DSL network.
Figure 2:
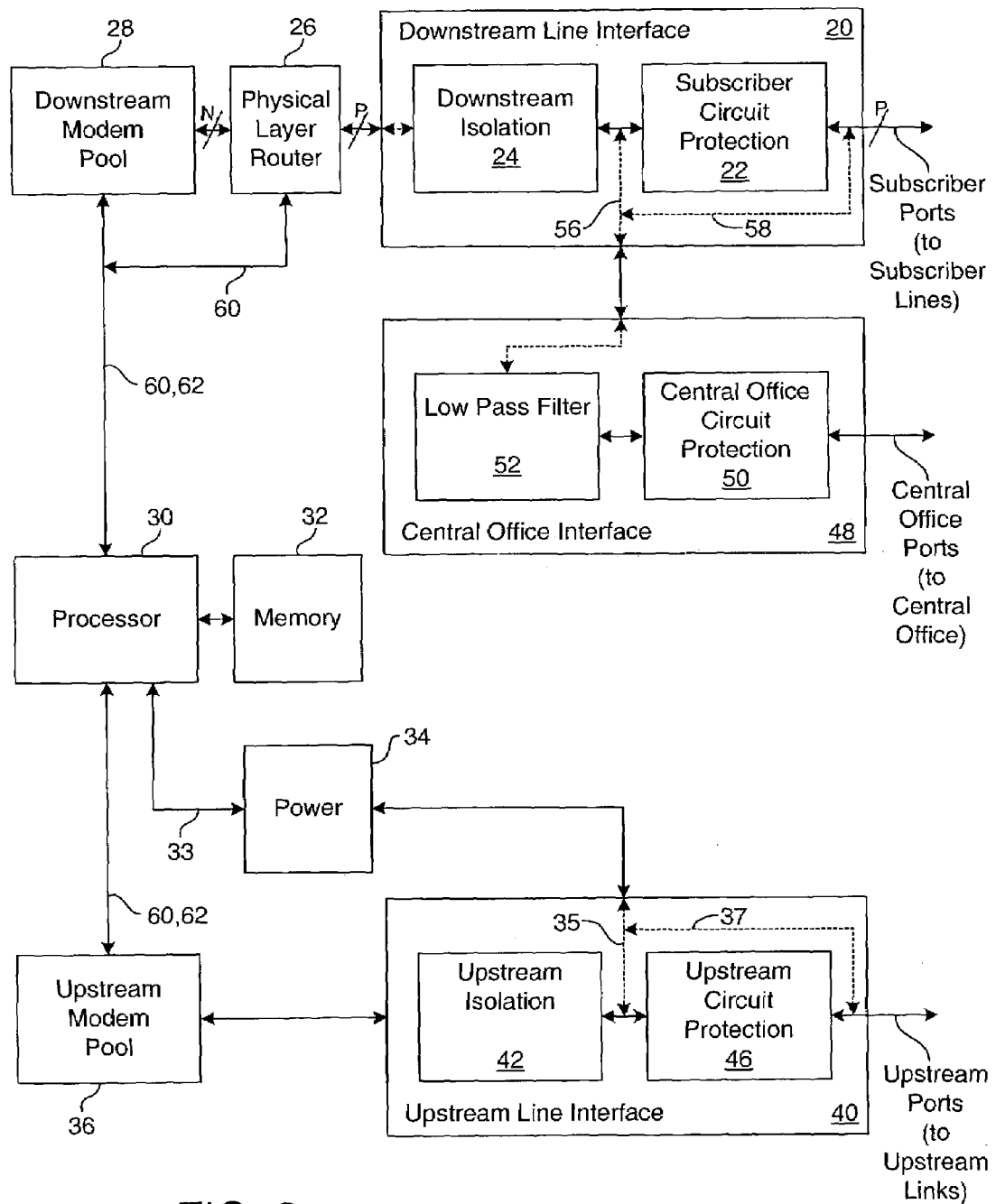
FIG. 2 is a universal broadband server.

FIG. 2 shows a universal broadband server. The universal broadband server is connected between a plurality of subscriber lines, at least one upstream link, and a central office. At least some of the subscriber lines are connected to customer premise equipment devices such as DSL modems, analog modems, and conventional telephones. The universal broadband server provides data services like broadband service, which may include xDSL service, to the customer premise equipment devices. The universal broadband server may also provide data services such as analog modem V.90 service to the customer premise equipment devices. Furthermore, the universal broadband server may provide simultaneous voice and data service to the customer premise equipment devices. The universal broadband server is able to provide oversubscribed service, that is, the universal broadband server is able to provide broadband service to N customers using less than N xDSL modems local to the universal broadband server.

The subscriber lines comprise POTS lines or twisted pair conductors, but may also include coaxial cable. The terms "POTS lines" and "twisted pair conductors" are used interchangeably. The upstream data links 22 may comprise, for example, a plain old telephone service (POTS) line, optical fiber, a twisted pair conductor, the Public Switched Telephone Network (PSTN), a T1 connection, a T3 connection, an ISDN connection, coaxial cable, an SHDSL link, an ADSL link, a VDSL link, an HDSL link, other forms of xDSL links, a V.90 link, an OCn link, and the like. The terms "DSL" and "xDSL" are used interchangeably herein and are intended to refer to any DSL standard such as those mentioned above. Furthermore, the term "broadband" includes xDSL service as well as other forms of high speed data communications.

The universal broadband server comprises a downstream modem pool 28, a physical layer router 26 in communication with the downstream modem pool 28, and a downstream line interface 20 in communication with the physical layer router 26. The downstream line interface 20 comprises a plurality of subscriber ports. The subscriber ports may be connected to the subscriber lines for connecting the universal broadband server to the customer premise equipment devices.

The downstream line interface 20 provides isolation between and circuit protection between the universal broadband server and the subscriber lines. In one embodiment, the downstream line interface 20 comprises downstream isolation circuitry 24 in communication with the physical layer router 26, and subscriber circuit protection 22 in communication with the downstream isolation circuitry 24. The subscriber circuit protection 22 is also in communication with the subscriber ports. The isolation circuitry 24 may comprise devices such as transformers, opto-isolators, or other devices operable to provide a 1 kilovolt isolation barrier. The subscriber circuit protection 22 may include devices to protect against power surges carried by the subscriber lines to the universal broadband server. These devices may include, for example, varistors, fuses, gas discharge tubes, MOVs, diodes, and the like.

The universal broadband server further comprises an upstream modem pool 36 and an upstream line interface 40 in communication with the upstream modem pool 36. The upstream line interface 40 comprises at least one upstream port for connecting the universal broadband server to the an upstream link or links. The upstream line interface 40 provides isolation between and circuit protection between the universal broadband server and the upstream link or links. In one embodiment the upstream line interface 40 comprises upstream isolation circuitry 42 in communication with the upstream modem pool 36, and upstream circuit protection 46 in communication with the upstream isolation circuitry 42. The upstream circuit protection 46 is also in communication with the upstream ports. As with the downstream isolation circuitry 24, the upstream isolation circuitry 42 may comprise devices such as transformers, opto-isolators, and other devices operable to provide a suitable isolation barrier. The upstream circuit protection includes devices to protect against power surges carried by the at least one upstream link to the universal broadband server. These devices may include, for example, varistors, fuses, gas discharge tubes, MOVs, diodes, and the like.

Further, the universal broadband server comprises a processor 30 in communication with the upstream modem pool 36, the downstream modem pool 28, and the physical layer router 26. The universal broadband server also comprises a memory 32 in communication with the processor 30, and power circuitry 34 in communication with the processor 30 and the upstream line interface 40. Additionally, the universal broadband server comprises a central office interface 48. The central office interface 48 is in communication with the downstream line interface 20 and comprises a plurality of central office ports for connecting the universal broadband server to the central office.

The central office interface 48 functions, in part, as a splitter to separate low frequency voice communications from higher frequency broadband communications, for allowing simultaneous voice and data communications. FIG. 3 shows the relative frequency bands for voice communications, labeled "VOICE", and xDSL communications, labeled "DSL". Typically, "VOICE" ranges from around 300 Hz to 3.4 kHz. In one embodiment, the central office interface 48 comprises a low pass filter 52 in communication with the downstream line interface 20, and central office circuit protection 50 in communication with the low pass filter 52. The central office circuit protection 50 is connected to the central office ports. The central office circuit protection 50 comprise devices such as varistors, fuses, gas discharge tubes, MOVs, diodes, and the like.

A typical transfer function for the low pass filter 52 is shown in FIG. 3 by the curve labeled "Low Pass Filter." Typically, the low pass filter has a cut-off frequency of around 4 kHz to 8 kHz thus separating the "VOICE" from the "DSL" communications. In one embodiment, the low pass filter is compliant with an ANSI T1.413 specification. Depending on the particular embodiment of the downstream line interface 20 and the central office interface 48, the low pass filter is in communication directly or indirectly with the subscriber lines. Referring to FIG. 2, in one embodiment the low pass filter 48 is in communication with the downstream line interface 20 after the subscriber circuit protection 22 as shown by arrow 56. In another embodiment, shown by arrow 58, the low pass filter 52 is in communication with the downstream line interface 20 before the subscriber circuit protection 22. Other equivalent embodiments are possible and will be evident to those of ordinary skill in the art. Additionally, depending on the particular embodiment, the central office interface 48 may further comprise additional isolation components and circuitry.

In operation, customers continue to receive POTS service via their telephones connected to the subscriber lines connected to the subscriber ports, through the downstream line interface 20, through the central office interface 48, and to the central office connected via the central office ports. Requests for broadband service from customer premise equipment devices are granted by the universal broadband server as described below. Once granted, broadband service flows through the downstream line interface 20, through the physical layer router 26, through the downstream modem pool 28, through the upstream modem pool 36, through the upstream line interface 40, and onto the at least one upstream link connected to the upstream ports.

The downstream modem pool 28 comprises a plurality of modems operative to communicate with the customer premise equipment devices. In one embodiment, the downstream modem pool 28 comprises digital signal processor modems operative to emulate a plurality of communication protocols, such as shown in FIG. 4. By way of example some of these protocols include VDSL, ADSL, HDSL, SHDSL, HDSL2, other forms of xDSL, ITU-T V.9x, faster analog modem protocols, and the like.

The downstream modem pool 28 of FIG. 4 shows one embodiment of a system for oversubscribing a pool of modems. The system, as well as alternative embodiments, is disclosed in U.S. patent application Ser. No. 10/159,496 filed May 31, 2002 by Timothy L. Kelliher, and entitled "Method and system for oversubscribing a pool of modems," the entirety of which is hereby incorporated by reference. The downstream modem pool may further include a faster analog modem apparatus for providing enhanced analog modem communications. The faster modem apparatus is disclosed in U.S. patent application Ser. No. 10/194,375 filed Jul. 12, 2002 by Timothy L. Kelliher, et al., and entitled "Faster modem method and apparatus," the entirety of which is hereby incorporated by reference.

Briefly, the downstream modem pool 28, the processor 30, and the upstream modem pool 36 are in communication with each other via busses 60, 62 as shown in FIG. 2. Processor bus 60 is used in part to configure the downstream modem pool 28 as described with reference to the applications referenced above. In one embodiment, processor bus 60 is a synchronous microprocessor interface. An example of such an interface is an 8 bit synchronous microprocessor interface. The interface may further comprise an interrupt line. Data bus 62 is used to communicate high speed data, such as broadband data between the downstream modem pool 28 and the upstream modem pool 36. In one embodiment, data bus 62 is an asynchronous microprocessor interface. One example of such an interface is an 8-bit UTOPIA-II bus operating at 155 Mbits/sec. Many other types of busses may be used with the present invention. For example a single high-speed synchronous or asynchronous bus may be used. Further, the busses may include an I2C bus.

The upstream modem pool 36 comprises a pool of modems for communicating with the at least one upstream link. In one embodiment the upstream modem pool comprises a plurality of HDSL2 modems. In other embodiments the upstream modem pool comprises xDSL modems or V.9x modems. The upstream modem pool may simultaneously comprise multiple types of modems. With reference to the upstream modem pool 36, the term "pool of modems" is understood to include a single upstream modem as well as a plurality of upstream modems. The upstream modem pool may be configurable via a processor bus, such as bus 60 described above.

Figure 5:
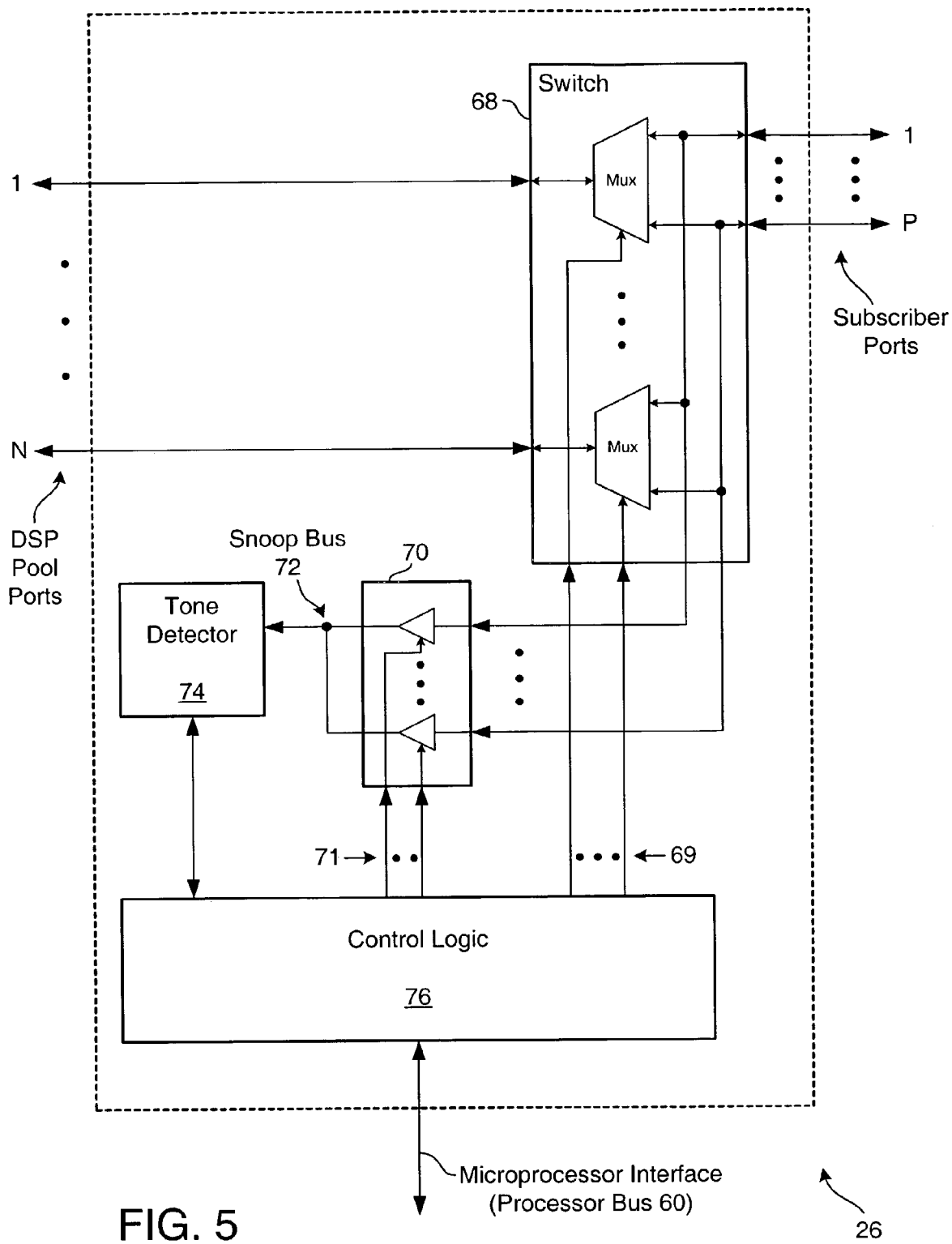
FIG. 5 is a physical layer router.

The physical layer router 26 is shown in greater detail in FIG. 5. The physical layer router 26 facilitates connecting N downstream data links from downstream modem pool 28 to any P subscriber ports, where P>N. The physical layer router 28 does this by determining which customer premise equipment device connected to a subscriber port is generating a request for service, isolating that device, and connecting the subscriber port, and thus the customer premise equipment device, to a dsp pool port connected to the downstream modem pool 28.

Referring to FIG. 5, the physical layer router comprises a plurality of subscriber ports and a plurality of dsp pool ports. The physical layer router further comprises a switch 68 comprising a subscriber line side, a dsp pool line side, and a control port 69. The subscriber line side is connected to the subscriber ports and the dsp pool line side is connected to the dsp pool ports. In one exemplary embodiment, the switch 68 is a cross-point switch comprising a plurality of bi-directional 1:50 multiplexers as shown in FIG. 5. Other equivalent types of switches may also be used. In one specific example, the switch 68 is a 24:50 "any port" cross-point switch thereby providing 24 dsp pool ports and 50 subscriber ports.

Further, the physical layer router comprises isolation circuitry 70 comprising a plurality of input ports in communication with the plurality of subscriber ports, a plurality of output ports, and an isolation control port 71. The output ports are connect together at summing node, forming a snoop bus 72. A tone detector 74 is connected to the snoop bus 72. The physical layer router further comprises control logic 76 connected to the tone detector 74, the switch control port 69, and the isolation control port 71. The control logic comprises a microprocessor interface. In one embodiment, the microprocessor interface is compatible with the processor bus 60 described above.

The control logic 76 issues control signals to the switch 68 and the isolation circuitry 70 in accordance with the methods described below. The control logic may send and receive information to the processor 30 via the microprocessor interface in order to issue the correct sequence of control signals 69, 71 and to configure the physical layer router 26. Briefly, isolation control signals 71 direct which subscriber ports are to be connected to the snoop bus 72. It is noted that the subscriber ports connected to the snoop bus 72 are isolatedly connected, that is, isolated subscriber port signals are connected at the snoop bus 72 rather than directly tapped subscriber port signals. This ensures that the subscriber ports are not shorted together and their signals can flow freely through the switch 68 and to the DSP pool ports. Switch control signals 69 direct the coupling of subscriber ports to dsp pool ports.

As mentioned briefly, the physical layer router 26 couples a plurality of subscriber ports to a plurality of dsp pool ports, wherein at least some of the plurality of subscriber ports are connected to customer premise equipment devices. Those customer premise equipment devices are operative to generate request tones. The request tones indicate that a customer premise equipment device is requesting service, that is, the customer premise equipment device is requesting, or is ready to accept, broadband service, or other types of data services, being provided by the downstream modem pool 28. The tones may comprise request tones such as an R-ACT-REQ tone as defined in ANSI T1.413 and ITU G.992. 1, tones within the voice frequency range, dial tones, and tones outside the POTS range, such as a 34.5 kHz tone.

Figure 6A:
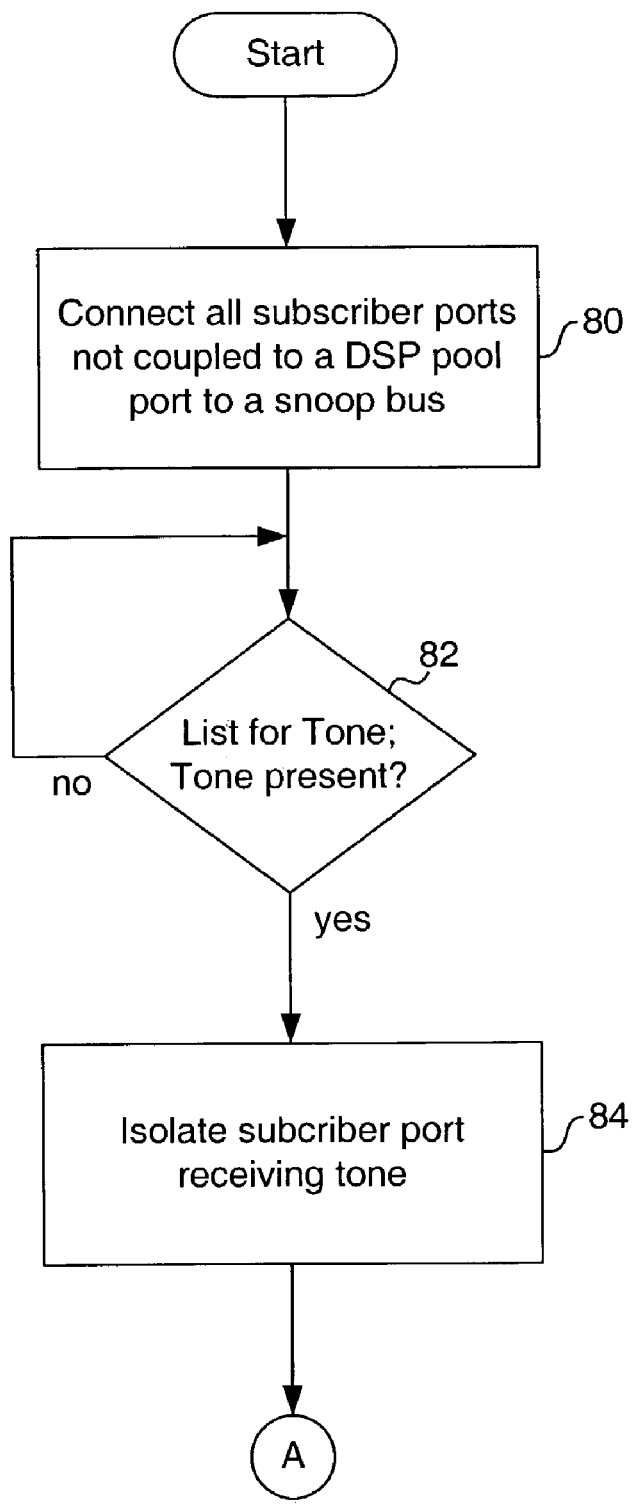
FIGS. 6A–C are flowcharts illustrating physical layer router methods.
Figure 6B:
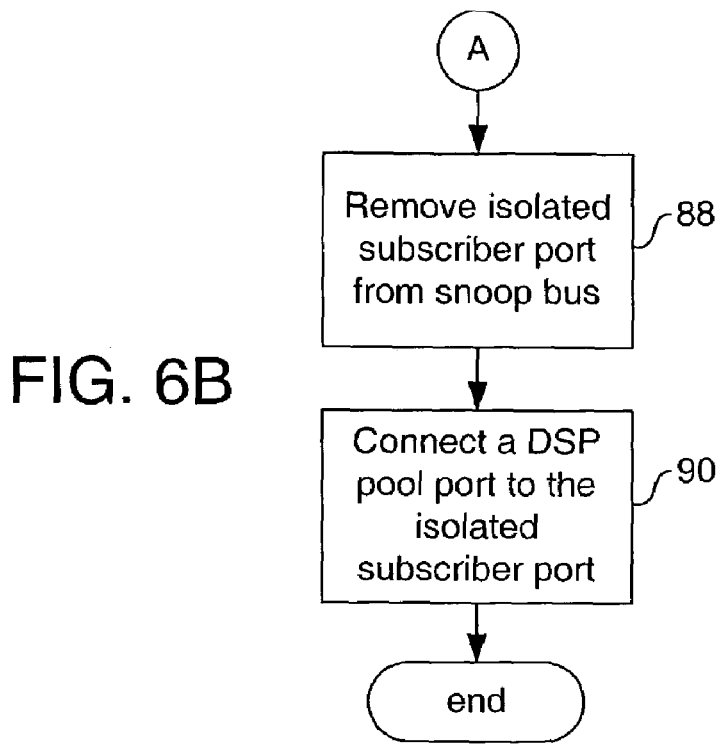

A physical layer router method is shown in FIG. 6A. First, all subscriber ports not coupled to a dsp pool port are connected to the snoop bus (step 80). A list of subscriber ports, dsp pool ports, and their respective connection states may be maintained at the physical layer router 26, or by the processor 30 and memory 32, or by a combination of the two. Depending on the particular implementation information necessary to issue the proper isolation control signals 71 may be transmitted to the physical layer router 26 via the processor bus 60. Next, the tone detector 74 listens for a tone on the snoop bus (step 82). Once the tone is detected, the subscriber port receiving the tone is isolated, or identified, from the other subscriber ports (step 84). If more than one subscriber port is receiving a tone, one of the more than one subscriber ports will be isolated. In one embodiment, shown in FIG. 6B, after the subscriber port is isolated, the isolated subscriber port is removed from the snoop bus (step 88) at the command of the control logic which issues an isolation control signal 71 to remove the subscriber port from the snoop bus 72. Then, the isolated subscriber port is connected to an available dsp pool port (step 90) upon the control logic issuing the appropriate switch control signal 69 to the switch 68.

Figure 6C:
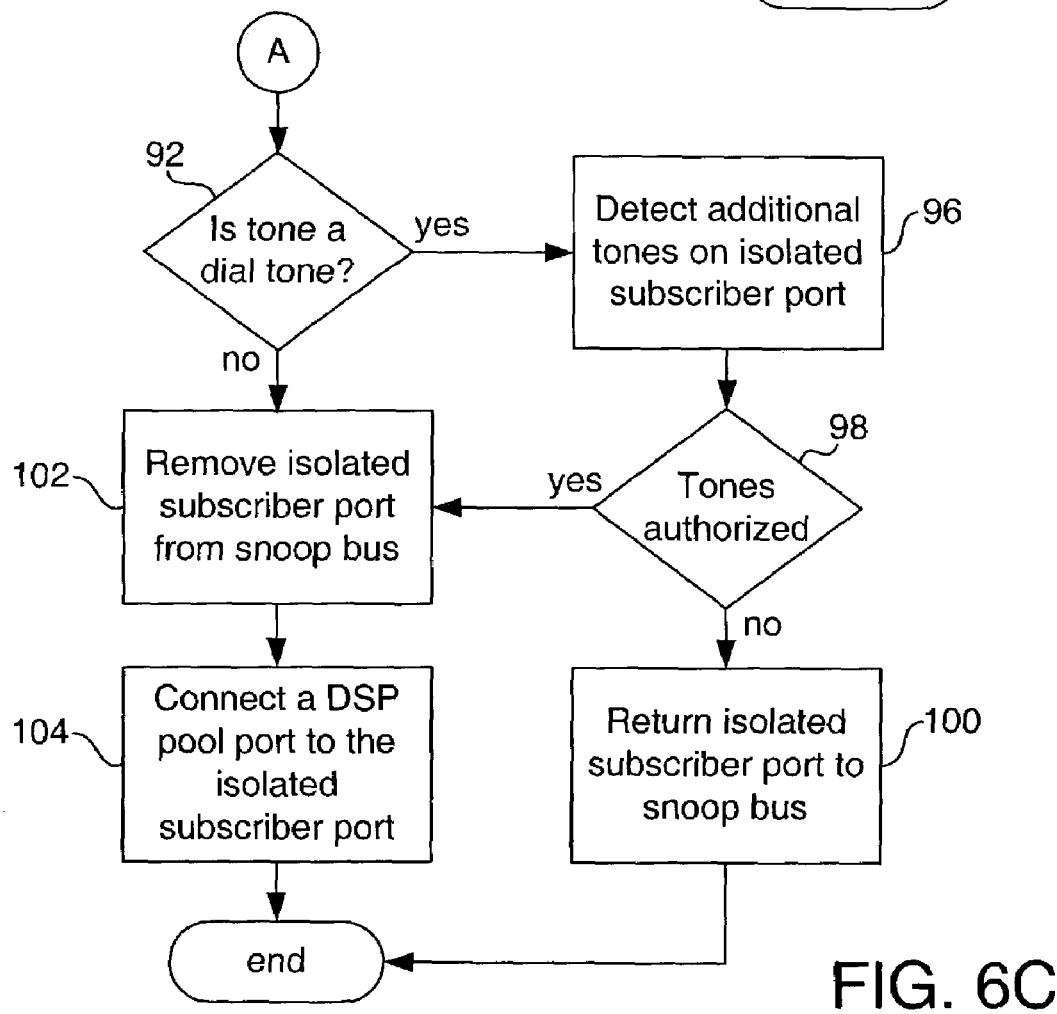

A second embodiment, shown in FIG. 6C, may be used for automatic discovery of analog modem requests such as V.9x and faster modem requests, as well as broadband such as xDSL requests. The methods of FIGS. 6A–C may be used in combination with each other. Following the isolation step (step 84) of FIG. 6A, the tone is inspected to determine if it is a dial tone (step 92). If the tone is a dial tone the method further comprises detecting additional tones on the isolated subscriber port (step 96). The additional tones may be tones such as described above, but may also comprise dual tone multi-frequency (DTMF) tones or a sequence of DTMF tones issued by the subscriber. The tones are used to provide access to the universal broadband server. If the tones are not authorized (step 98) the isolated subscriber port is returned to the snoop bus, that is no service is provided to the customer premise equipment device connected to the port. If the tones are authorized (step 98) the isolated subscriber port is removed from the snoop bus (step 102) and the isolated subscriber port is connected to a dsp pool port (step 104) as discussed above.

Figure 7:
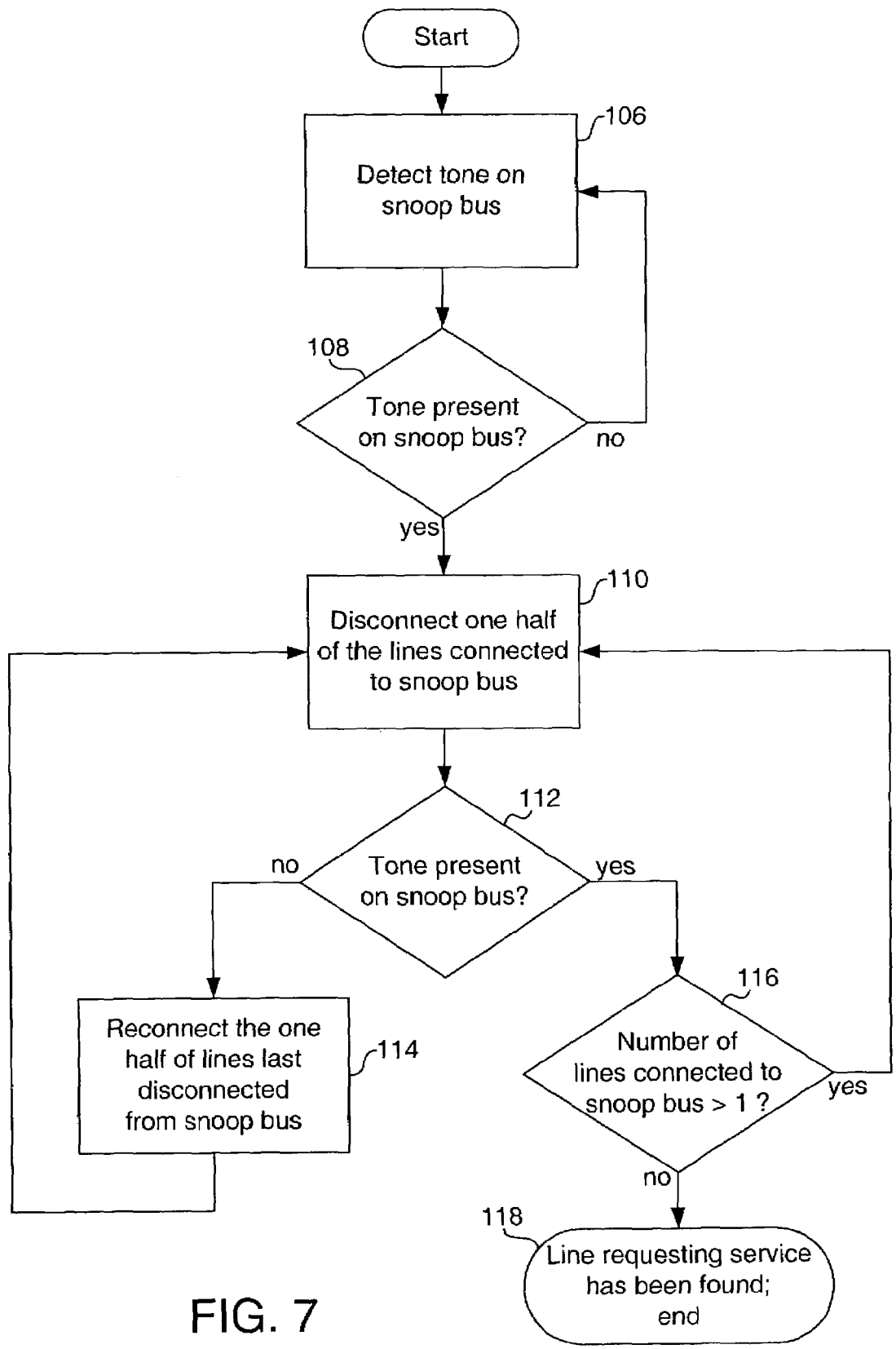
FIG. 7 is a flowchart showing a fast line acquisition method of the physical layer router.

A fast line acquisition method, shown in FIG. 7, is employed by the tone detector 74 to quickly isolate the port on which service is being requested. Referring to FIG. 7, a tone is detected on the snoop bus (step 106), and upon detecting the tone (step 108) one half of the plurality of subscriber lines connected to the snoop bus are disconnected from the snoop bus (step 110). After disconnecting half of the subscriber lines, the snoop bus is checked to determine if the tone is still present on the snoop bus (step 112). If the tone is not still present, the half of the subscriber lines last disconnected from the snoop bus are reconnected to the snoop bus (step 114) and a different half of lines are disconnected from the snoop bus (step 110), followed by step 112. If the tone is still present on the snoop bus (step 112), it is determined if the number of lines connected to the snoop bus is greater than one (step 116). If the number of lines connected to the snoop bus is greater than one, half of the lines connected to the snoop bus are disconnected from the snoop bus (step 110), followed by step 112. If at step 116 the number of lines connected to the snoop bus is not greater than one, then the subscriber line requesting service has been found (step 118) and the subscriber port is isolated.

Turning back to FIG. 2, the universal broadband server comprises a processor 30, a memory 32 in communication with the processor 30, and power circuitry 34 in communication with the upstream line interface 40. In one embodiment, the power circuitry 34 is in communication with the upstream line interface 40 after the upstream circuit protection 46 as shown by arrow 35. In another embodiment, indicated by arrow 37, the power circuitry 34 is in communication with the upstream line interface 40 before the upstream circuit protection 46.

By way of example, the upstream ports may be connected to a plurality of twisted pair conductors, or tip-ring pairs. For example, there may be thirteen tip-ring pairs connected to the upstream ports, and thus to the power circuitry 34. The power circuitry 34 comprises circuitry such as dc-to-dc converters for producing voltages and sufficient current from the tip-ring pairs for powering the universal broadband server. Further, the power circuitry produces a power signal 33, $P_{max}$, that indicates the maximum power available for powering the universal broadband server. In one embodiment, the power signal 33 is a reference voltage. It is noted that while the power circuitry 34 is shown in communication with the upstream line interface 40, the power circuitry 34 can equivalently be connected to other power sources, such as batteries, power lines, fuel cells, the AC powered grid, hydroelectric power, wind power, solar power, and other forms of electrical power. Depending on the specific implementation, the power circuitry may comprise components such as dc-to-dc converters, transformers, relays, surge protection devices, isolation devices, and the like.

The processor 30 receives as input the power signal 33. The memory 32 comprises executable that causes the processor 30 to provide signals to at least the downstream modem pool 28 that cause the downstream modem pool 28 to be configured such that a bit-rate, $B_{Port}$, of each subscriber port, and a transmit power, $P_{Port}$, of each subscriber port, is maximized. In short, given that there is a maximum power available, $P_{max}$, and a maximum upstream bandwidth, also referred to maximum back-haul bit rate, $B_{max}$, the bit rates and power of each subscriber line is adjusted to make best use of that maximum available power and bandwidth. $B_{Port}$ and $P_{Port}$ are maximized according to the following equations:

$$\sum_{Port=0}^{N} B_{Port} = B_{max}$$

$$\sum_{Port=0}^{N} P_{Port} = P_{max}$$

$$P_{Port} = F(L_{Port}, B_{Port})$$

where $B_{max}$ is a maximum back-haul bit-rate. For example, if there are two upstream ports connected to two HDSL2 upstream links providing 1.544 Mbps each, then the maximum back-haul bit-rate is 3.088 Mbps;

$P_{max}$ is the maximum power available for powering the universal broadband server as described above;

$B_{Port}$ is the bit-rate for the subscriber port, that is the bit-rate at which the universal broadband server communicates with each customer premise equipment device;

$L_{Port}$ is a length of each subscriber line connecting each subscriber port to each customer premise equipment device;

$P_{Port}$ is the transmit power of each subscriber port. There is a direct correlation between the transmit power, the bit rate, and the length of each subscriber line. For example for a fixed bit-rate, it requires more power to transmit at that bit-rate over a longer line than it does over a shorter line. Also, in general, higher bit-rates can be achieved by transmitting at a higher power;

F is a function that calculates the transmit power $P_{Port}$ required for each port in order to communicate at rate $B_{Port}$ given length $L_{Port}$. In one embodiment, F is a minimum margin algorithm function as shown in FIG. 9.

Figure 8:
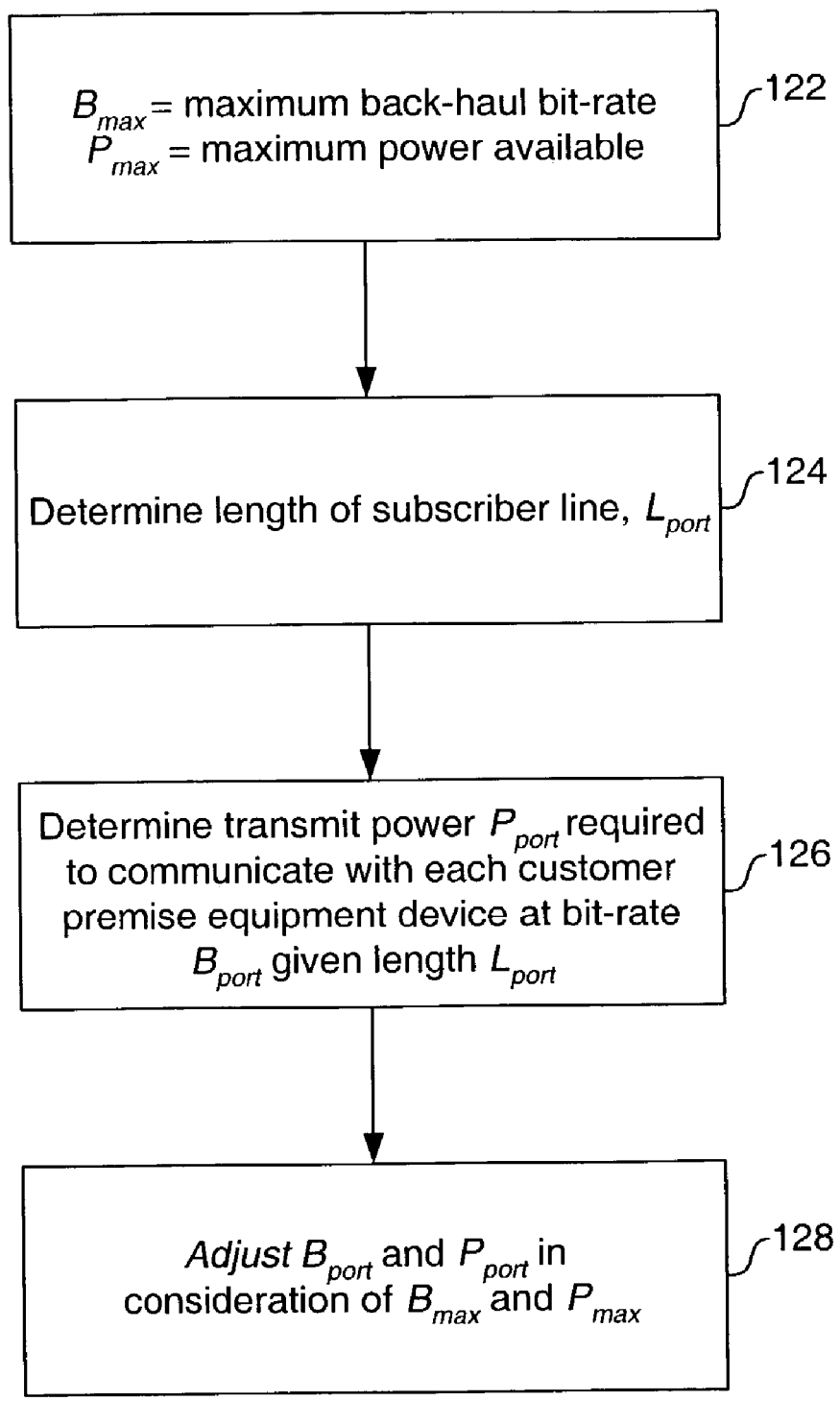
FIG. 8 is a flowchart showing a dynamic bandwidth allocation method.

Turning to FIG. 8, a dynamic bandwidth allocation method in accordance with the above power discussion is shown. First, $B_{max}$ and $P_{max}$ are provided (step 122). Next, the length of each subscriber line $L_{Port}$ is determined (step 124). In many cases $L_{Port}$ may not be known. $L_{Port}$ can be determined according to a time domain reflection method. Time domain reflection is well understood by those of ordinary skill in the art. In step 126, for each port, the transmit power $P_{Port}$ required to communicate with each customer premise equipment device at a bit-rate of $B_{Port}$ over the subscriber line having a length $L_{Port}$ is determined. One method of determining $P_{Port}$ makes use of a minimum margin algorithm function, one such example being commercially provided by Globespan Inc.

Figure 9:
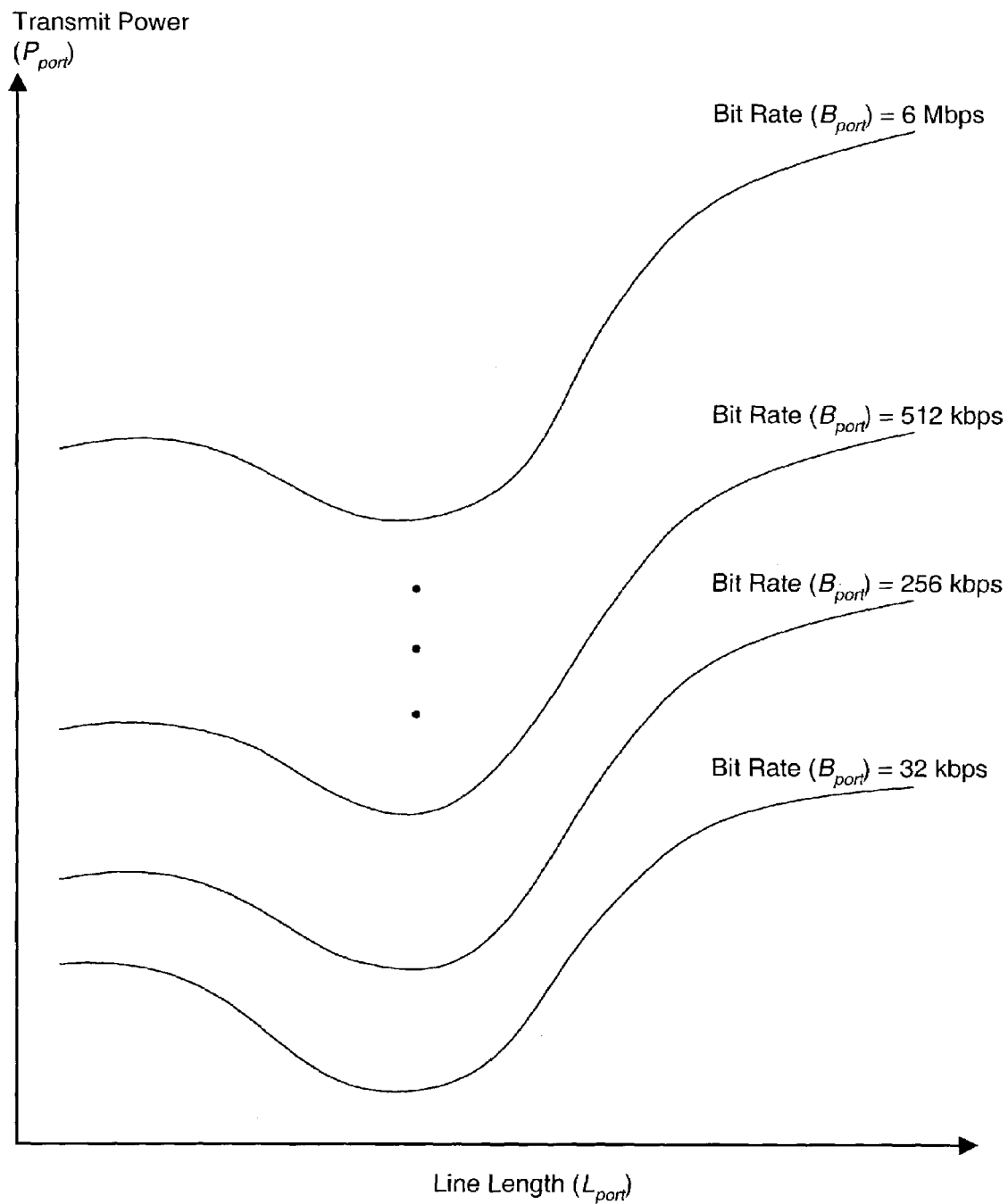
FIG. 9 is a graph showing the curves of a minimum margin algorithm function.

An exemplary graph illustrating the curves of the minimum margin algorithm function is shown in FIG. 9. The graph shows that there is a determinable transmit power $P_{Port}$ for any given bit-rate $B_{Port}$ and line length $L_{Port}$. One implementation of the function illustrated in FIG. 9 samples data points on the graph, stores those points as a table or database in the memory 32, and finds the closest match for $P_{Port}$ stored in the memory once $B_{Port}$ and $L_{Port}$ are known. It is noted that the data represented in FIG. 9 can be empirically determined through measurements of line power, bit rate, and transmit power.

Turning back to FIG. 8, following step 126, $B_{Port}$ and $P_{Port}$ are adjusted in accordance with step 126 such as to make best use of $B_{max}$ and $P_{max}$ (step 128), that is:

$$\sum_{Port=0}^{N} B_{Port} = B_{max}$$

$$\sum_{Port=0}^{N} P_{Port} = P_{max}.$$

Upon finding a solution, the processor 30 transmits control signals and commands to the downstream modem pool 28 and if necessary to other components of the universal broadband server to adjust the transmit power of each subscriber port in accordance with the solution.

The universal broadband server as described is extremely power efficient and supports a plurality of communication protocols. Additionally the universal broadband server may be powered the by upstream lines as described above. This combination allows the universal broadband server to be placed in locations such as a pedestal box, cross-connect cabinet, service area cross-connect, service area interface, or other box or cabinet located between a customer's home or business and the central office or digital loop carrier. The universal broadband server may also comprise an interface port such as an RS-232 serial interface in communication with the processor 30. The interface port may be used to send and receive commands, configuration information, and communication statistics between the universal broadband server and an external device. Other interface ports include serial ports, parallel ports, USB ports, IEEE 1394 ports, wireless ports, and the like.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A universal broadband server, the universal broadband server connected between a plurality of subscriber lines, at least one upstream link, and a central office, each of the plurality of subscriber lines adapted to be connected to a customer premise equipment device, the universal broadband server comprising:

a downstream modem pool;

a physical layer router in communication with said downstream modem pool;

a downstream line interface in communication with said physical layer router, said downstream line interface comprising a plurality of subscriber ports connected to the plurality of subscriber lines;

an upstream modem pool;

an upstream isolation interface in communication with said upstream modem pool, said upstream isolation interface comprising at least one upstream port connected to the at least one upstream links;

a processor in communication with said upstream modem pool, said downstream modem pool, and said physical layer router;

a memory in communication with said processor;

power circuitry in communication with a power source and with said processor;

a central office interface in communication with said downstream line interface, said central office interface comprising a plurality of central office ports in communication with the central office.

2. The invention of claim 1 wherein the power source comprises the at least one upstream link.

3. The invention of claim 1 wherein said downstream line interface comprises:

downstream isolation circuitry in communication with said physical layer router; and subscriber circuit protection in communication with said downstream isolation circuitry and with said plurality of subscriber ports.

4. The invention of claim 1 wherein said upstream line interface comprises:

upstream isolation circuitry in communication with said upstream modem pool; and upstream circuit protection in communication with said upstream isolation circuitry and said at least one upstream port.

5. The invention of claim 1 wherein said central office interface comprises:
   a low pass filter in communication with said downstream line interface; and
   central office circuit protection in communication with said low pass filter and said plurality of central office ports.

6. The invention of claim 1 wherein said physical layer router comprises a fast line acquisition tone detector.

7. The invention of claim 1 wherein said upstream modem pool comprises at least one HDSL2 modem.

8. The invention of claim 1 wherein said downstream modem pool comprises a system for oversubscribing a pool of modems.

9. The invention of claim 1 wherein said downstream modem pool comprises a faster analog modem apparatus.

10. The invention of claim 1 wherein said downstream modem pool comprises digital signal processor modems operative to emulate a plurality of communication protocols.

11. The invention of claim 1 wherein said processor and said downstream modem pool are in communication via an asynchronous microprocessor interface.

12. The invention of claim 1 wherein said processor and said upstream modem pool are in communication via an asynchronous microprocessor interface.

13. The invention of claim 1 wherein said processor and said physical layer router are in communication via a synchronous microprocessor interface.

14. The invention of claim 1 wherein said memory comprises processor executable code that causes said processor to provide signals to at least said downstream modem pool, the signals causing said downstream modem pool to be configured such that a bit-rate, $B_{Port}$, of each of the plurality of said subscriber ports and a transmit power, $P_{Port}$, of each of said plurality of subscriber ports are maximized.

15. The invention of claim 14 wherein $B_{Port}$ and $P_{Port}$ are maximized according to the following equations:

$$\sum_{Port=0}^{N} B_{Port} = B_{\max}$$

$$\sum_{Port=0}^{N} P_{Port} = P_{\max}$$

$$P_{Port} = F(L_{Port}, B_{Port})$$

where
$B_{max}$ is a maximum back-haul bit-rate,
$P_{max}$ is a maximum power available for powering the universal broadband server,
$B_{Port}$ is the bit rate for the subscriber port,
$L_{Port}$ is a length of each of the plurality of subscriber lines connecting each subscriber port to each customer premise equipment device,
$P_{Port}$ is the transmit power of the subscriber port, and
F is a function that calculates the power required for each subscriber port in order to communicate at rate $B_{Port}$ given length $L_{Port}$.

16. The invention of claim 15 wherein F is a minimum margin algorithm function.

17. A dynamic bandwidth allocation method for maximizing bandwidth and power in a broadband server comprising a plurality of N ports, the broadband server connected between a back-haul, and a plurality of customer premise equipment devices, each of the customer premise equipment devices connected to a port of the plurality of ports of the broadband server via a subscriber line, the method comprising:
   (a) providing a maximum back-haul bit-rate $B_{max}$;
   (b) providing a maximum power available $P_{max}$ for powering the broadband server;
   (c) determining a length $L_{Port}$ of each subscriber line connected to each port;
   (d) determining a transmit power $P_{Port}$ for each port required to communicate with each customer premise equipment device at a bit-rate $B_{Port}$ over the subscriber line having the length $L_{Port}$; and
   (e) adjusting $B_{Port}$ and $P_{Port}$ for each port according to (d) such that the following conditions are satisfied:

$$\sum_{Port=0}^{N} B_{Port} = B_{\max}$$

$$\sum_{Port=0}^{N} P_{Port} = P_{\max}$$

18. The invention of claim 17 wherein said determining $P_{Port}$ in (d) further comprises determining according to a minimum margin algorithm function.

19. The invention of claim 17 wherein said determining $L_{Port}$ in (c) further comprises determining according to a time domain reflection method.

20. A dynamic bandwidth allocation system for maximizing bandwidth and power in a broadband server comprising a plurality of N ports, the broadband server connected between a back-haul, and a plurality of customer premise equipment devices, each of the customer premise equipment devices connected to a port of the plurality of ports of the broadband server via a subscriber line, the system comprising:
   means for providing a maximum back-haul bit-rate $B_{max}$;
   means for providing a maximum power available $P_{max}$ for powering the broadband server;
   means for determining a length $L_{Port}$ of each subscriber line connected to each port;
   means for determining a transmit power $P_{Port}$ for each port required to communicate with each customer premise equipment device at a bit-rate $B_{Port}$ over the subscriber line having the length $L_{Port}$; and
   means for adjusting $B_{Port}$ and $P_{Port}$ for each port according to said means for determining the transmit power such that the following conditions are satisfied:

$$\sum_{Port=0}^{N} B_{Port} = B_{\max}$$

$$\sum_{Port=0}^{N} P_{Port} = P_{\max}$$

* * * * *